United States Patent [19]

Callihan

[11] 4,433,553
[45] Feb. 28, 1984

[54] PROCESS FOR THE REFRIGERATION OF AN ENCLOSURE

[75] Inventor: Clayton D. Callihan, Baton Rouge, La.

[73] Assignee: Louisiana State University Board of Supervisors, Baton Rouge, La.

[21] Appl. No.: 427,705

[22] Filed: Sep. 29, 1982

Related U.S. Application Data

[62] Division of Ser. No. 232,535, Feb. 9, 1981, Pat. No. 4,380,458.

[51] Int. Cl.³ .............................................. F25D 17/06
[52] U.S. Cl. ....................................................... 62/94
[58] Field of Search .................. 536/90, 91, 99; 62/94

[56] References Cited

U.S. PATENT DOCUMENTS

| | | | |
|---|---|---|---|
| 2,160,782 | 5/1939 | Maasberg | 536/99 |
| 3,709,876 | 1/1973 | Glomski et al. | 536/91 |
| 3,839,319 | 10/1974 | Greminger et al. | 536/91 |
| 4,294,731 | 10/1981 | Allen | 536/91 |
| 4,380,458 | 4/1983 | Callihan | 55/33 |

FOREIGN PATENT DOCUMENTS

| | | | |
|---|---|---|---|
| 486361 | 9/1952 | Canada | 536/90 |
| 1076969 | 7/1967 | United Kingdom | 536/91 |
| 1407132 | 9/1975 | United Kingdom | 536/91 |
| 410030 | 4/1974 | U.S.S.R. | 536/90 |

*Primary Examiner*—Ronald W. Griffin
*Attorney, Agent, or Firm*—Llewellyn A. Proctor

[57] ABSTRACT

A solid methyl cellulose desiccant wherein from about 0.6 to 1.8, preferably 0.9 to 1.5 of the available hydroxyl groups of the anhydroglucose units of the cellulose entity have been replaced by methyl, or methyl and hydroxyl alkyl or carboxy alkyl groups, if any, containing from 2 to about 4 carbon atoms, e.g. hydroxy ethyl, hydroxy propyl, carboxyl methyl and the like. In the solid methyl cellulose desiccant, at least one of the substituting groups must be methyl, with the remainder of the substituting groups, if any, hydroxy alkyl or carboxy alkyl, or both; preferably carboxy methyl, if any. At least one-half of the substituting groups are methyl, and preferably at least two-thirds of the substituting groups are methyl; the balance of the substituting groups, if any, being hydroxy alkyl or carboxy alkyl groups. Methyl cellulose of this character can be contacted with a water-containing stream at a temperature below which it will have great affinity for and will absorb significant amounts of water; and conversely above this temperature the methyl cellulose will not only lose this affinity but in addition may give up a large portion of any water it had previously absorbed.

7 Claims, 1 Drawing Figure

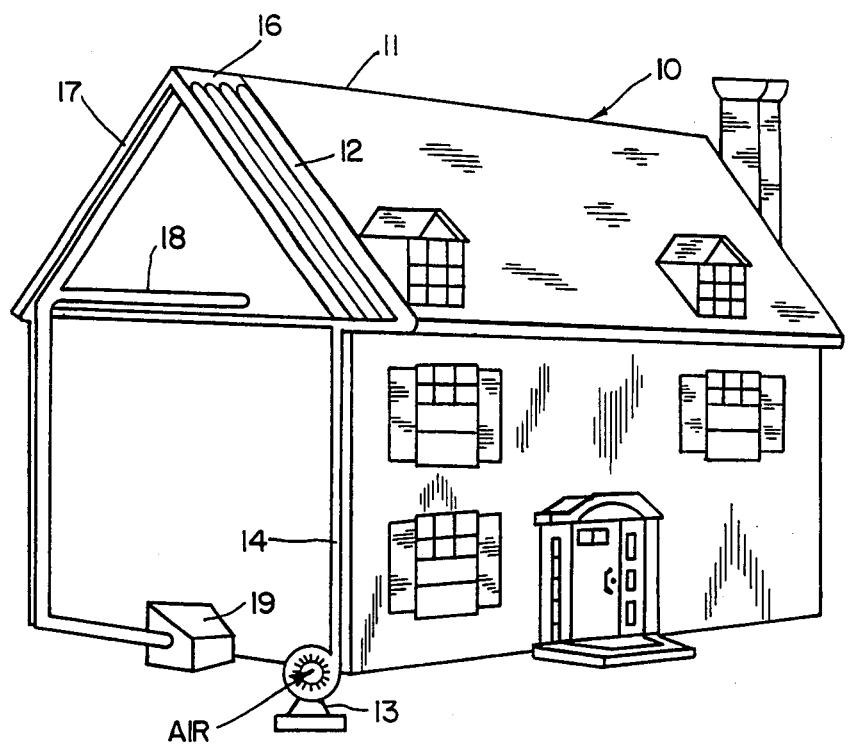

PROCESS FOR THE REFRIGERATION OF AN ENCLOSURE

This is a division of application Ser. No. 232,535, filed Feb. 9, 1981, now U.S. Pat. No. 4,380,458, issued Apr. 19, 1983.

Many industrial processes produce water as a by product of a chemical reaction, the water as a contaminating constituent of a fluid stream from which it must be separated, and removed. In some natural environments too water is a desirable product, and its recovery is a worthwhile objective in itself. For example, in the production of absolute alcohol, e.g. ethyl alcohol from a constant boiling mixture of ethyl alcohol and water, it is essential to remove the water from the admixture to form this useful industrial chemical compound. Illustrative also, in the production of methyl and ethyl cellulose water is produced as one of several by-products, and water must be separated from the reaction mixture to avoid further hydrolysis reactions which produce additional undesirable by-products. Desiccants, as is known, can be used for the separation of water from such streams, even the separation and recovery of water from air, but desiccants are not nearly so energy efficient as desired, particularly in todays short energy supply situation.

Known desiccants include bauxite, inorganic oxide gels, notably silica and alumina, silica-alumina, activated carbon, molecular sieves and the like. Desiccants for the dehydration of liquids, e.g. alcohols, are also well known and include such materials as sodium sulfate, copper sulfate, zinc chloride, mercuric chloride, potassium carbonate, carboxy methyl cellulose and the like. Solids desiccants are generally used in palpable particulate form and include such shapes as tablets, pellets, spheres and the like. Liquids, e.g. ethylene glycol, have also been used as desiccants, or absorbents, as for the dehydration of alcohols. In the use of desiccants for most industrial purposes the dehumidification step is conducted in a packed column and, when the desiccant is sufficiently wet that its water adsorption capacity is impaired, it is revivified or regenerated by contact with a dry gas, generally at elevated temperature. Generally too, the dehydration and revivification steps are conducted in parallel vessels to provide a continuous operation. The notoriously energy inefficient portion of the operation resides in the revivification, or regeneration of the desiccants. Large quantities of heat are required to dry the wet desiccants, and one-step operations wherein the wet desiccant is discarded are generally even more prohibitive.

It is, accordingly, the primary objective of the present invention to provide a new and novel composition, or desiccant useful for the dehumidification, or dehydration of wet materials contacted therewith.

A specific objective is to provide a new and novel desiccant, particularly useful for the dehumidification, or dehydration of fluids; notably gaseous, liquid or mixed phase streams.

A further object is to provide a desiccant, or drying agent as characterized which can be easily regenerated by low temperature heat.

Yet another, and more specific object is to provide a desiccant, and process utilizing said desiccant, which is suitable for the extration of water from a fluid, notably cool air, and the wet desiccant thereafter heated to a higher, slightly elevated temperature, notably by the rays of the sun, at which temperature the desiccant will release its absorbed water to its surroundings and become dry, as well as lose its normal afinity for water at the elevated temperature; and which desiccant will regain its normal affinity for water on being brought back to said lower temperature.

These objects and others are achieved in accordance with the present invention which embodies a solid methyl cellulose desiccant wherein from about 0.6 to about 1.8, preferably from about 0.9 to about 1.5, of the available hydroxyl groups of the anhydroglucose units of the cellulose entity have been replaced by methyl, or methyl and other hydroxy alkyl or carboxy alkyl groups, if any, containing from 2 to about 4 carbon atoms, e.g. hydroxy ethyl, hydroxy propyl, methyl hydroxy ethyl, methyl hydroxyl propyl, carboxy methyl, carboxy ethyl, carboxy propyl groups, or the like. In the solid methyl cellulose desiccant, at least one of the substituting alkyl groups must be methyl, with the remainder of the substituting groups, if any, either hydroxy alkyl or carboxy alkyl or both; preferably carboxy methyl, if any. At least one-half of the substituting groups are methyl, and preferably at least two-thirds of the substituting groups are methyl; the balance of the substituting groups, if any, being hydroxy alkyl or carboxy alkyl groups. Methyl cellulose of this character can be contacted with a water-containing stream at a temperature below which it will have great affinity for and will absorb significant amounts of water; and conversely above this temperature the methyl cellulose will lose this affinity and not absorb any significant amount of water. This temperature, defined as the syneresis temperature of the methyl cellulose, can be varied over a range of from about 100° F. to about 195° F., more often over a range of from about 140° F. to about 160° F., dependent upon the degree of substitution and, to some extent, upon the nature and proportion of the substituent groups themselves.

Methyl cellulose, as known, is a cellulose ether comprised of linear chains of $\beta$-anhydroglucose rings, manufactured from cellulose. Cellulose, in its natural state is polysaccharide composed of a variable number of individual anhydroglucose units linked together through the 1 and 4 carbon atoms with a $\beta$-glucosidic linkage characterized, e.g., by Haworth et al, as follows:

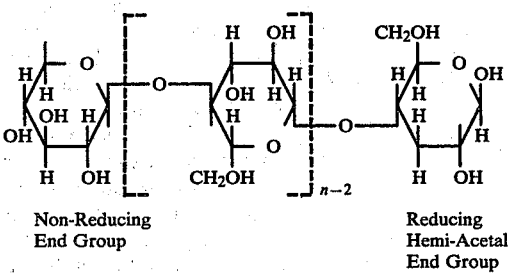

Non-Reducing End Group

Reducing Hemi-Acetal End Group

Haworth, W. N., Hirst, E. L., and Thomas, H. A., "Polysaccharides, Part VII," J. Chem. Soc. 824(1931). The hydroxyl groups of cellulose are the primary reaction sites and, it will be noted, comprise, with the moieties to which they are associated, a primary alcohol attached to the number 6 carbon atom and secondary alcohols attached to the number 2 and 3 carbon atoms, these being sites which can react to form ethers of cellulose. The hydroxyl groups of a monomer unit (N-2), through the exertion of hydrogen bonding, cause considerable intermolecular attraction of the Van der Wall type between chains, thus lessening the reactivity normally expected of alcohols until such time as the cellulose has become solvated.

The number of monomer units in a single chain of cellulose can range from a few hundred, or less, to several thousand, e.g., 30 to 5000, or more, and the structure of cellulose is basically crystalline in nature, partially due to the stiff glucosidic chains, the presence of the hydroxyl groups, and because of the length and flexibility of the chains which results in their entanglement. Some amorphous regions, however, do exist in the cellulose chain. Due to the intermolecular forces holding the molecules together, solvent penetration is more difficult than in lower molecular weight compounds but various techniques are well known to the art for hydrolysis or solvation of cellulose, and after solvation the primary and secondary hydroxyl groups become accessible so that ethers can be formed. Chemically, after solvation of the cellulose, cellulose reacts basically in the same manner as primary and secondary alcohols. The average number of hydroxyl groups replaced, based on the three available hydroxyl groups per anhydrogluclose unit, determines the degree of substitution (D.S.) on the chain. A fully substituted cellulose derivative, e.g., would have a degree of substitution of 3.0 whereas a degree of substitution of 0.6 would mean that an average of twenty percent of the available hydroxyl reaction sites have been replaced while eighty percent remain as free hydroxyl groups; or, a degree of substitution of 1.8 would mean that an average of sixty percent of the available hydroxyl reaction sites have been replaced while forty percent remain as free hydroxyl groups. In accordance with the present invention, e.g., a solid methyl cellulose desiccant having a D.S. of 0.6 would have an average of twenty percent of the available hydroxyl reaction sites substituted by methyl, or at least one-half (10%) and preferably two-thirds (16%) of the available hydroxyl reaction sites substituted by methyl, with the balance of the substituted reaction sites containing hydroxy alkyl or carboxy alkyl groups. A solid methyl cellulose having a D.S. of 1.8, on the other hand, would have an average of at least 60 percent of its available hydroxyl reaction sites substituted by methyl, or at least one-half (30%), and preferably at least two-thirds (40%) of the available hydroxyl reaction sites substituted by methyl, with the balance of the substituted hydroxyl reaction sites containing hydroxy alkyl or carboxy alkyl groups. Substitution occurs most readily within the amorphous regions of the cellulose, and the degree of substitution has marked effect on the solubility of the of the substituted cellulose; the more substituted the chain, the more soluble the substituted product or derivative up to a certain limiting number above which the nature of the solubility changes such that very highly substituted products may not be soluble in water but may be soluble in organic solvents.

Strong bases can thus be used to partially solvate the natural cellulose, causing it to swell, thus allowing for easier penetration by reactants for formation of ethers. The swelling or etherifying agents disrupt hydrogen bonding and other secondary forces bonding the hydroxyl groups and thereby increases the uniformity of access so that the reactions can be produced. Some common swelling agents are alkali metal hydroxides, e.g., the hydroxides of potassium, lithium, cesium, rubidium, and the like, liquid ammonia, trimethylsulfonium hydroxide, guanidinium hydroxide, cupraammonium hydroxide, trimethylbenzylammonium hydroxide, and the like. Alkali or alkaline earth metal hydroxides are particularly preferred and are commonly used to effect partial solvation because it is low in cost and provides desired uniform product distribution with minimum degration.

The presence of the methyl groups in the solid methyl cellulose desiccant of interest is essential in order to develop a low gelation temperature, this being essential to develop in the solid methyl cellulose desiccant of interest the high affinity for water at low temperature. Within the cellulose chain the methyl group is unique in that is it ideally sized to provide hydrogen-bonding adsorption sites, or "voids" sufficient for the adsorption, and retention of water below a given syneresis temperature. The presence of some hydroxy alkyl or carboxy alkyl groups is permissable, and in some instances desirable, but because of their size, the distance between the cellulose chains is increased and so, consequently, is the ability of the methyl cellulose to reject the water hydrating the hydroxyl groups to obtain gelation. Moreover, not only does increased substitution per se increase gelation temperature, but the increased size of the substituting groups themselves produces increased gelation temperature which is undesirable.

The solid methyl cellulose desiccant of this invention is thus a unique specie within the class of methyl cellulose ethers, and it has unique properties as contrasted with known members of this class which are prepared for use in solution, and have commercial value because of this characteristic. The following energy efficient usages thus exemplify the solid methyl cellulose desiccants of this invention, to wit:

(1) A fermentation broth can be distilled to recover a constant boiling mixture, or azeotrope, containing 95.57 percent ethyl alcohol in water. This mixture contacted with a solid methyl cellulose desiccant (DS=1.8), the substituting groups being all methyl, to preferentially absorb the water away from the mixture. The wetted solid desiccant can then be separated from the essentially pure, absolute alcohol, dried in a stream of air, or in the ambient atmosphere in sunlight, and then reused.

(2) A wet product vapor stream from a vessel within which conventional methyl cellulose is being prepared can be contacted with the desiccant of (1), supra, and the water preferentially absorbed. Water thus removed from the product stream results in the suppression of hydrolysis reactions which normally lead to the production of undersirable by-products, and consequently, to the consumption of costly reactants.

(3) Water can be obtained from cool night air by passage over the desiccant of (1), supra, packed within a tube, to saturate it with water. By exposure of the tube of wetted desiccant to the morning sun, the temperature of the desiccant exceeds its syneresis temperature, about 140° F., and the water is released by the desiccant. An air stream passed through the tube can pick up the water, and the air then cooled in a water condenser to recover the water; thus making water available in the desert using the sun as the only energy source.

The polymeric, solid methyl cellulose desiccant exemplified in (1), (2) and (3), supra, will thus absorb water very rapidly at temperatures below 120° F. In contrast, when the temperature of the desiccant is increased to 140° F., the desiccant suddenly and completely loses its ability to adsorb and retain water, but rather releases water to its surroundings. It is believed that this absorption-desorption phenomenon results from the ability of the polymer molecules to hydrogen bond to each other above the syneresis temperature, while below the syneresis temperature the polymer preferentially bonds to water molecules. The importance of this phenomenon is that the polymeric, solid methyl cellulose of this invention can be dried at very low temperatures, particularly at solar temperatures such as those available during normal daylight hours. Even though other desiccants are known, high temperatures are required for drying such desiccants this making conventional heating, or refrigeration which may use such desiccants, at best, only solar assisted. The present unique methyl cellulose desiccant makes possible true solar heating, and refrigeration.

The process of this invention, at the heart of which lies the novel solid methyl cellulose desiccant, requires generally an initial contact of a cool moisture-containing stream of air with said desiccant at below its syneresis temperature at which point in time the desiccant will adsorb and retain water, with concurrent adiabatic heating of the dehumidified air. The warm dehumidified air, as would be expected, can be used to maintain an enclosure, or facility, e.g. residence, plant work space or office, at comfortable temperature during cold months, e.g. as in winter. In a subsequent step, where refrigeration is desired, as in summer, the desiccant can be used to dry ambient air with the accompanying generation of heat. The hot dry air is then cooled by exchange with ambient air, and the cool dry air then passed through a water evaporator which further cools down the air to a comfortable temperature for use in cooling an enclosure, or facility, e.g., residence, plant work space or office. The desiccant can then be dried by raising its temperature in a solar collector to above the gel temperature.

The process, and the principle of its operation, will be better understood by reference to the following more detailed description of a preferred embodiment, and to the attached FIGURE to which reference is made as the description unfolds. This embodiment shows methods by means of which a typical residence can be heated or refrigerated.

Referring to the FIGURE there is depicted a typical residence 10, or house with roof 11 within which is mounted one or a plurality of tubes 12 packed with the solid methyl cellulose desiccant of this invention, one segment of tubes of which are shown for simplicity of illustration. A pump 13 located at a corner of the house can withdraw ambient, cool air from the atmosphere and pump same via line 14 into a header 15 from which it is introduced through the series of tubes 12 packed with the solid methyl cellulose desiccant of this invention. The air, on passage through the desiccant filled tubes 12 has its water removed, or is dried, while simultaneously the air is warmed. The warm dry air is discharged from tubes 12 into the header 16, and then into the house 10 via line 17 and manifold 18. The warm air is distributed throughout the house by ductwork (not shown). The desiccant can be regenerated by reversal of the air flow by withdrawal of air from ambient and feeding same into line 17 at a period when the house need not be warmed, or while another unit (not shown) is supplying warm air to the interior of the house.

By precooling the warm dry air, as by heat exchange means not shown, e.g. with ambient air, with subsequent passage of the cool dry air into the house 10 through a humidifier 18, on the other hand, the cool dry air can be further cooled to refrigerate the house, as in summer when cooling is needed.

Integration of the tubes 12 into conventional solar collection panels (now shown) to permit the rays of the sun to play upon the tubes during the period of regeneration provides an energy efficient means to regenerate the desiccant. It is thus but a simple matter to shade the tubes during the adsorption portion of the cycle, and to expose the tubes to the sun during the regeneration portion of the cycle to desorb the moisture from the desiccant.

Whereas it is known to use a drying agent, or desiccant to initially dry humid air, which causes adiabatic heating, with subsequent cooling of the adiabatically heated air by heat exchange with ambient air, and final vaporization of water into the air with some type of humidifier to obtain refrigeration, the difficulty with such processes is that once the desiccant or drying agent is saturated with water it has to be dried with high temperature heat in order to make the desiccant give up its moisture. Most systems must therefore burn natural gas, butane or steam to regenerate the drying beds. Quite obviously if high temperature heat must be used to remove the water from the desiccant, this same heat could more advantageously by used to run an ammonia evaporation refrigeration system or conventional cooling system, and consequently, present desiccants do not provide suitable means to make solar heating, and refrigeration a reality. Real world economics, today requires a lessened use of, or avoidance of fossil fuels as energy sources for low cost heating, and refrigeration.

In the process of this invention, on passage of air over the solid methyl cellulose derivative (D=1.8), the desiccant, for example, picked up 17% moisture when exposed to 80% relative humidity (RH) for 24 hours at room temperature, but lost moisture down to 3% while still exposed to 80% RH but with the temperature increased to 160° F. A second derivative exposed at the same conditions picked up 14% water at ambient temperature but when heated to 160° F. while still at 80% RH lost water down to 1%. On both samples the cycle was repeated several times with almost identical gain and loss of moisture due obviously only to changes in temperature.

This invention makes solar refrigeration truly solar. No high temperature gas drier is needed to regenerate the bed because the desiccant of this invention will obviously dry at temperatures easily available in the day time in summers e.g. at the peak of the roof which may reach temperatures as high as 160° F. to 180° F., depending on the temperatures of the air entering the tubes at the bottom and on its relative humidity. The lower the initial relative humidity the lower will be the rise in temperature of air reaching the plenum at the peak of the roof.

The hot-dry air coming to the peak of the roof from the solar collectors on the roof not facing the sun (or at night) will pass into a heat exchanger (not depicted in the drawing) whose purpose will be to exchange heat with ambient air to cool down the hot air as much as possible. The hot-dry air should cool down to within 5° to 10° F. of ambient air. This may in some cases require baffles on the inside of the heat exchanger and radiation fins on the outside, and such apparatus is not very difficult to fabricate.

Once the dry air is cooled to within a few degrees above ambient it is sucked into a blower which forces it to go thru moistened pads to humidify it and to cause cooling of the air. Again the temperature that the humidified air will drop to will depend on how much water remains in the air and its temperature before entering the humidification chamber. Usually the air temperature will drop to 60° to 65° F. This cool air will generally be forced either into the house if cooling is required or into some kind of energy storage chamber such as stones or gravel. This energy storage material may be cooled down at night and thru the day the desiccant could be dried by the sun. Cold air may be pulled from the storage chamber whenever refrigeration is required. On the other hand, drying of the air can be done during part of the day when the roof is in the shade and on the other part of the roof the desiccant could be dried simultaneously by the sun, which would require less desiccant.

It is apparent that certain variations can be made without departing the spirit and scope of the present invention. In its essence, the present invention is based on the discovery of unique solid methyl cellulose desiccants which can absorb large quantities of water at temperatures below a syneresis temperature ranging from about 100° F. to about 195° F., preferably about 140° F. to about 160° F., depending upon its composition. Below this temperature it will hold the water tightly, and above this temperature it will reject the water so that it can be easily dried by application of low temperature heat. In particular, the desiccant can be used for drying air below the syneresis temperature; and by virtue of its nature the desiccant will undergo a solid state transition when the temperature exceeds the syneresis temperature which causes it to lose its affinity for water almost completely such that on the application of low temperature heat, as when the sun is shining and the temperature reaches syneresis temperature, the water is quickly swept away by an air stream, drained off or decanted from the desiccant. This unique desiccant can provide large savings in both energy and capital costs, and is particularly useful for solar heating, and refrigeration applications.

Having described the invention, what is claimed is:

1. A process for the refrigeration of an enclosure which comprises contacting a stream of air with a desiccant characterized as solid methyl cellulose wherein from about 0.6 to about 1.8 of the available hydroxyl groups of the anhydroglucose units constituting the basic cellulose entity have been replaced by methyl, or methyl and other hydroxy alkyl or carboxy alkyl groups containing from 2 to about 4 carbon atoms where at least one-half of the substituting groups are methyl, to dehumidify and warm said stream of air, cooling said stream of air by heat exchange with a cooler non-reactive material, humidifying said cooled stream of air to refrigerate same, and then injecting said refrigerated air into said enclosure.

2. The process of claim 1 wherein the desiccant is solid methyl cellulose, and at least two-thirds of the substituting groups are methyl, where all of the substituting groups are not methyl.

3. The process of claim 1 wherein the desiccant is solid methyl cellulose which contains carboxy methyl groups.

4. The process of claim 1 wherein the desiccant is solid methyl cellulose, and essentially all of the substituting groups are methyl.

5. The process of claim 1 wherein the desiccant is solid methyl cellulose which contains hydroxyl propyl groups.

6. The process of claim 1 wherein the syneresis temperature of the solid methyl cellulose desiccant ranges from about 100° F. to about 195° F.

7. The process of claim 1 wherein the syneresis temperature of the solid methyl cellulose desiccant ranges from about 140° F. to about 160° F.

* * * * *